June 4, 1957 H. P. HINTZ ET AL 2,794,364

MULTIPLE LINE PHOTOCOMPOSING

Filed Nov. 29, 1954 6 Sheets-Sheet 1

JAMES F. HAYDEN
HARVEY P. HINTZ
GLEN W. OFFENSEND
ROBERT W. WETHERALD
INVENTORS

BY Daniel J. Mayne

Lloyd F. Seibach
ATTORNEY & AGENT

June 4, 1957 H. P. HINTZ ET AL 2,794,364

MULTIPLE LINE PHOTOCOMPOSING

Filed Nov. 29, 1954 6 Sheets-Sheet 2

JAMES F. HAYDEN
HARVEY P. HINTZ
GLEN W. OFFENSEND
ROBERT W. WETHERALD
INVENTORS

BY Daniel I. Mayne

Lloyd F. Seebach
ATTORNEY & AGENT

JAMES F. HAYDEN
HARVEY P. HINTZ
GLEN W. OFFENSEND
ROBERT W. WETHERALD
INVENTORS
BY Daniel J. Mayne
Lloyd F. Aubach
ATTORNEY & AGENT

MULTIPLE LINE PHOTOCOMPOSING

JAMES F. HAYDEN
HARVEY P. HINTZ
GLEN W. OFFENSEND
ROBERT W. WETHERALD
INVENTORS

BY Daniel I. Mayne
Lloyd F. Seebach
ATTORNEY & AGENT

JAMES F HAYDEN
HARVEY P. HINTZ
GLEN W. OFFENSEND
ROBERT W. WETHERALD
INVENTORS
BY Daniel I. Mayne
Lloyd F. Seebach
ATTORNEY & AGENT

JAMES F. HAYDEN
HARVEY P. HINTZ
GLEN W. OFFENSEND
ROBERT W. WETHERALD
INVENTORS

BY Daniel I. Mayne
Lloyd F. Sebach
ATTORNEY & AGENT

United States Patent Office 2,794,364

Patented June 4, 1957

2,794,364

MULTIPLE LINE PHOTOCOMPOSING

Harvey P. Hintz, James F. Hayden, Glen W. Offensend, and Robert W. Wetherald, Rochester, N. Y., assignors to Eastman Kodak Company, Rochester, N. Y., a corporation of New Jersey Application November 29, 1954, Serial No. 471,758

14 Claims. (Cl. 88—24)

This invention relates to photography and particularly to apparatus for photographically copying predetermined areas of documents or cards on a film strip. More particularly, the invention relates to photographically copying documents or cards having areas to be copied which are equal in length and multiples of a predetermined increment in width and provided with code means thereon for designating the width of the copy area and in which the amount of film to be advanced and the size of the exposure aperture are simultaneously varied for each document or card in response to the code means designating the width of the area to be copied.

In the pending patent application Serial No. 326,938, filed December 19, 1952, now Patent No. 2,738,704, photographic copying apparatus is described wherein the number of lines to be arranged within a column of fixed or predetermined length can be varied. This is accomplished by first typing or printing within the same predetermined area one or more lines of the information to be copied and by providing in the apparatus means for varying the film advance in accordance with the number of lines comprising the column of fixed length. Thus, as pointed out in the example, a column normally accepting 120 lines of type can be varied to accept more or less lines, the total amount of film advanced always being the same irrespective of the justification for the number of lines. Hence, a variable number of exposures can be made in equivalent lengths of the film strip. Such apparatus necessitates, however, that each card have the same predetermined area; that is, the information whether of one or more lines is always confined within an area having a predetermined width. As a result, any card having a greater width of copy will only be photographed in part.

In the present invention, this shortcoming is eliminated in that the aperture in the photographing station is made sufficiently large in order that cards having a copy area width greater than the predetermined width can also be photographed. By providing an area on the card which is of a length in accordance with the width of a column on the film and a width which is variable but based on a multiple of a predetermined width, as many lines may be typed or printed on a card as are necessary to complete the desired information. Further, the width of the area to be copied can be designated on the card in the form of code for designating the number of such predetermined increments of width comprising the area to be copied. Then, as the cards are fed successively into the photographing station, a signal can be derived from the code which will control means for varying the film advancing mechanism as well as the width of the exposure aperture as described more fully hereinafter.

The primary object of the invention is, therefore, to provide a photocopying apparatus in which means for advancing a film strip is varied to advance said film strip in multiples of predetermined increments in accordance with the width of the area to be copied and simultaneously to also vary the width of the exposure aperture in accordance with the width of the area to be copied.

Another object of the invention is to provide a photocopying apparatus in which the film advanced through the exposure station and a masking member adjacent the exposure station are varied in response to a signal derived from a code on the document which is indicative of the number of predetermined increments comprising the width of the area of the document to be copied.

Yet another object of the invention is to provide a photocopying apparatus in which the amount of film to be advanced and the size of the exposure aperture is established simultaneously by means responsive to a code on the documents which is indicative of the number of predetermined increments comprising the width of the area of the document to be copied.

And still another object of the invention is to provide a photocopying apparatus in which a plurality of actuating members associated with the film advancing means and a plurality of actuating members associated with the means for masking the exposure aperture are responsive to the signal derived from the card being moved into photographing station, said actuating members in each of the groups being rendered operative in different combinations by the derived signal, whereby the amount of film to be advanced and the size of the exposure aperture are in accordance with the width of the area to be copied.

These and other objects and advantages will be readily apparent to those skilled in the art by the description which follows.

Reference is now made to the accompanying drawings wherein like reference numerals designate like parts and wherein.

A preferred embodiment of the invention is disclosed in conjunction with apparatus which feeds the cards successively from the bottom of a stack positioned in a feeding station into a photographing station in which the area on the card which is to be copied is aligned with a photographing aperture. Although the apparatus utilizes cards that are available commercially, such as IBM cards, it is to be understood that other types of cards or discrete sheets may be used and the term "document" as used herein is meant to designate any single sheet having an area to be copied which is of a fixed length and any multiple of a predetermined increment in width, each document also being provided with means, such as a code, which is indicative of the number of such increments comprising the width of the area to be copied. While the preferred embodiment of the invention is disclosed in connection with photographing predetermined areas of a card, it is also applicable to photocopying apparatus in which documents of different sizes are completely photographed.

Figures 1, 2, 3:
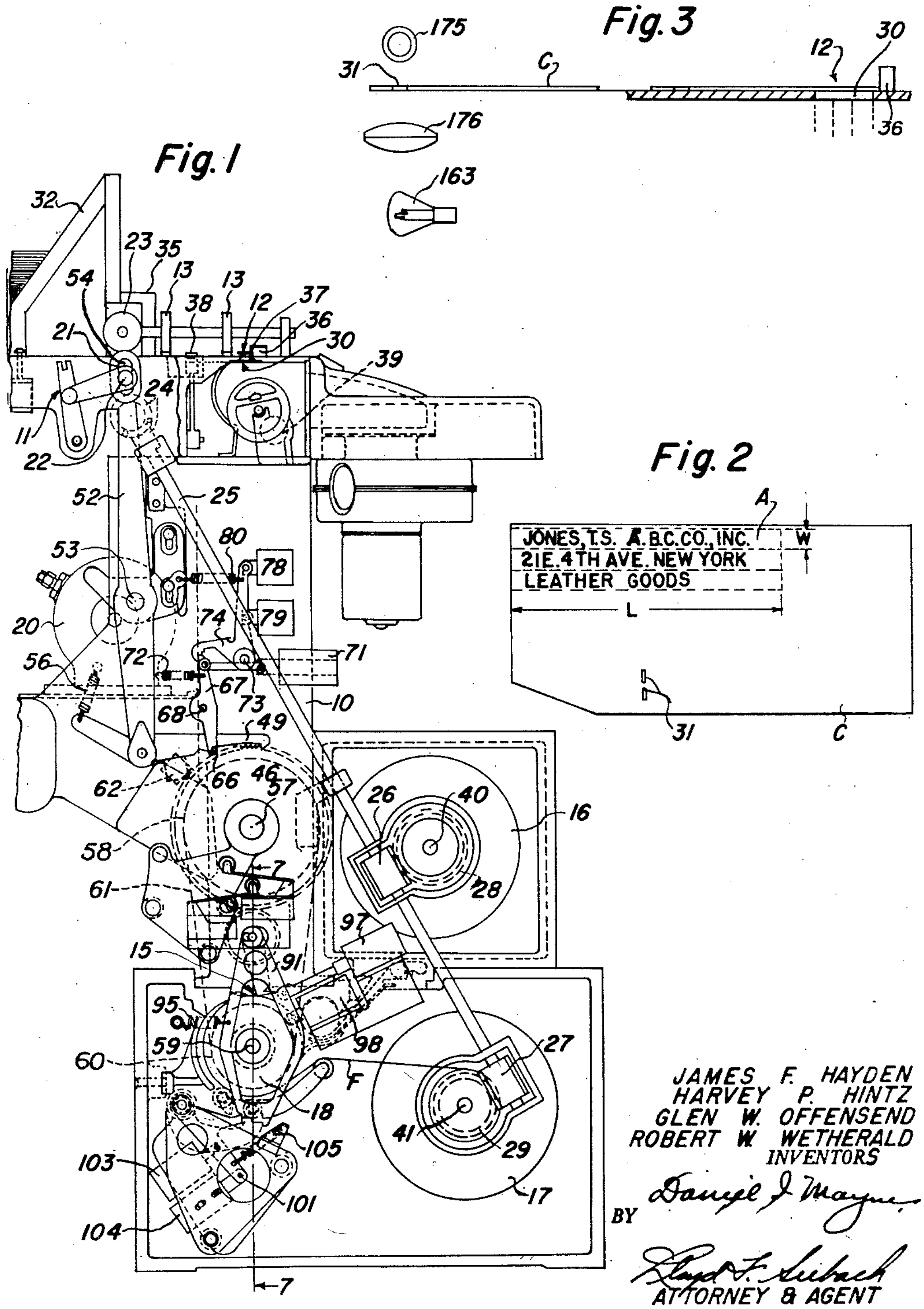
Fig. 1 is a side elevation of photocopying apparatus embodying the invention.
Fig. 2 is a plan view of a card and showing the predetermined increments of width comprising the area of the card to be copied and the code designating the width of the copy area.
Fig. 3 is a schematic side elevation showing the relation of the various elements comprising the scanning or sensing station and their relation to the photographing station.

The copying apparatus comprises a frame 10 on which is mounted a document feeding means 11 for moving the document into photographing station 12 which is spaced from the feeding station and then by means of feed rolls 13 at right angles thereto for depositing the documents in a suitable receptacle. A projection lens, not shown, is mounted on frame 10 between photographing station 12 and exposure station 15 and images the area of each document or card to be copied in said exposure station. The film strip F is moved through exposure station 15 from supply reel 16 to take-up reel 17 by film drive roll 18, as shown in Fig. 1 and more completely described in the above-mentioned application.

Figure 9:
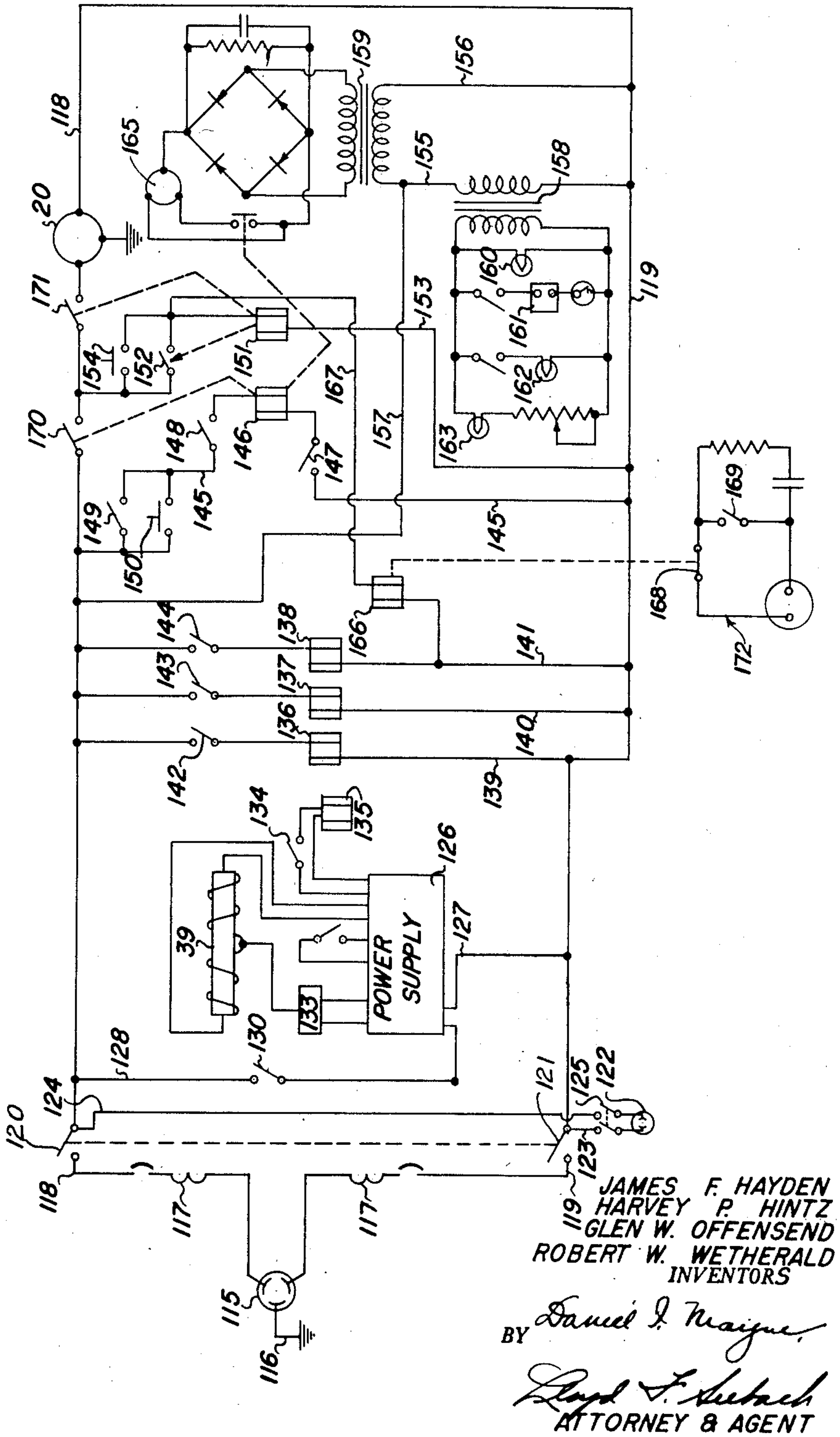
Fig. 9 is a wiring diagram of the circuits for operation of the embodiment of the apparatus disclosed in Fig. 1.

As disclosed in the above-mentioned application, the motor 20, diagrammatically shown in Fig. 9, by means of suitable interconnections comprising a chain drive and gears, drives shaft 21 which has fixed to one end thereof an eccentrically arranged stud 22. Through suitable gear connections feed rolls 23 are rotated to move the document into photographing station 12 and feed rolls 13 are rotated to move the document at right angles thereto and into a receptacle, the cards or documents being removed from the stack and photographing station by means of reciprocating pickers. Bevel gears 24 rotate shaft 25 on which are secured worm gears 26 and 27 which, in turn, by means of worm wheels 28 and 29 and tendency drives, not shown, rotate supply spindle 40 and take-up spindle 41, respectively, in a manner well-known in the art.

The cards C are arranged in some predetermined and designated order and counted for the number of increments of area to be photographed. Such a card is shown in Fig. 2 as comprising three areas A, each of the areas being indicated by dotted lines. On the card disclosed the areas are shown arranged adjacent two edges of the card; however, the copy area may be located in any position thereon which, of course, would necessitate location of the photographing aperture 30 in accordance therewith. The size of the area as well as its location can also be varied. In composing a directory, catalogue, etc., the width of the column is determined from the number of columns that are to be placed on each page and on the basis of the column width and the reduction or magnification factor of the information on the card to be printed in the column, the length L of the copy area can be determined. Likewise, the width W of the area A can be determined from the number of lines which are to appear in area A, the size of type to be used, the reduction factor, etc., and the number of such increments will depend on the amount of information that is to appear in the total area. As a result, the length L will be the same for all cards but the overall width will vary depending on the number of increments of width W on each card. Therefore, in composing a column of 120 increments the number of increments comprising each card must be taken into consideration. If each card contains three increments, then only forty cards are needed to make up a column. On the other hand, if the number of increments varies between one and three, then the number of cards will be greater than forty. In order to make the machine fully automatic, the number of increments comprising each card can be punched in or printed on the card. This can be varied, as shown in Fig. 2, where at 31 the card is punched or printed with two designating marks instead of three. In this case, the apparatus upon receiving no signal, automatically adjusts itself for a single increment as more fully described hereinafter.

After counting the increments and arranging the cards in the order desired, the cards are then placed in hopper 32 with the area to be photographed facing downward, the bottom card of the stack being moved toward photographing station 12 by reciprocating pickers and into the bite of feed rolls 23 which move the card through scaning station 35 and into station 12 against an edge of locating bar 36 arranged adjacent aperture 30. The card is moved under and held in position by springs 37 while in the photographing station and the area to be copied is then properly arranged and aligned with respect to aperture 30. Although the area which is to be copied is in the present instance adjacent both edges of a card, the bar 36 and aperture 30 could be so positioned with respect to each other so that any area of card C could be photographed. Pickers 38, which are operated in synchronism with the first-mentioned pickers then engage the end of the card and move it in a direction perpendicular to its former movement and into the bite of rolls 13 which move the card into a receptacle, not shown. A tubular type mercury vapor lamp 39 is arranged parallel to and beneath aperture 30 to illuminate the area to be photographed and is energized in timed relation to the movement of a card into and out of photographing station 12. This type of lamp is used to give very brief but intense illumination of aperture 30.

The film advancing means comprises film drive roll 18, ratchets 46, 47 and 48, pawls 49, 50 and 51 and the oscillatable arm 52. Arm 52 is pivotally mounted at 53 to frame 10, the longer portion thereof being provided with an elongated aperture 54 for engaging eccentric stud 22 and the lower portion being provided with spaced slots 55 in which pawls 49, 50 and 51 are pivotally mounted. The pawls are biased toward the ratchets by springs 56. Ratchets 46, 47 and 48 are keyed or otherwise secured to shaft 57 as well as sprocket 58 which drives film drive roll shaft 59 through sprocket 60 fixed to shaft 59 and chain 61 encircling said sprockets. As stud 22 is moved in a circular path, arm 52 is oscillated and carries with it pawls 49, 50 and 51 which are moved over their respective ratchets when the lower end of arm 52 is moved to the right in Fig. 1 and engage the ratchets to rotate shaft 57 and sprocket 58 and, hence, sprocket 60, shaft 59 and film drive roll 18 when the lower end of arm 52 is moved to the left. The film advancing means is, therefore, operatively connected to the document feeding means and is moved in synchronism therewith, since the eccentric arrangement of stud 22 also oscillates the pickers.

The film advancing mechanism, as more fully described in the above-mentioned application, moves equivalent lengths of the film strip but it may be that the number of exposures in the same lengths of the film strip may differ. For this reason, only one of the plurality of ratchets on shaft 57 will be operable at any one time. Each of ratchets 46, 47 and 48 are of the same diameter so that the peripheries are of the same length and for each revolution thereof the film drive roll 18 is always rotated through the same angle to advance equivalent lengths of the film strip. As pointed out in the above-mentioned application, such a group of ratchets are provided with a plurality of teeth of the same pitch to provide a leader and trailer portion on the film strip, whereas the intermediate portion of each ratchet is provided with a different number of teeth. In this way the leader and trailer ends as well as the intermediate copy portions are always of the same length so that the overall lengths of the film strips are always equal for each preselected number of cards. In the present invention, however, the film strip may be moved in one, two, three or more increments in accordance with the number of increments comprising the area to be copied. Since the full movement of each pawl is the same, the movement is made sufficiently large so that the pawl will pick up the proper tooth, the difference representing an amount of lost motion in movement of the pawl as described more fully hereinafter.

Figure 4:
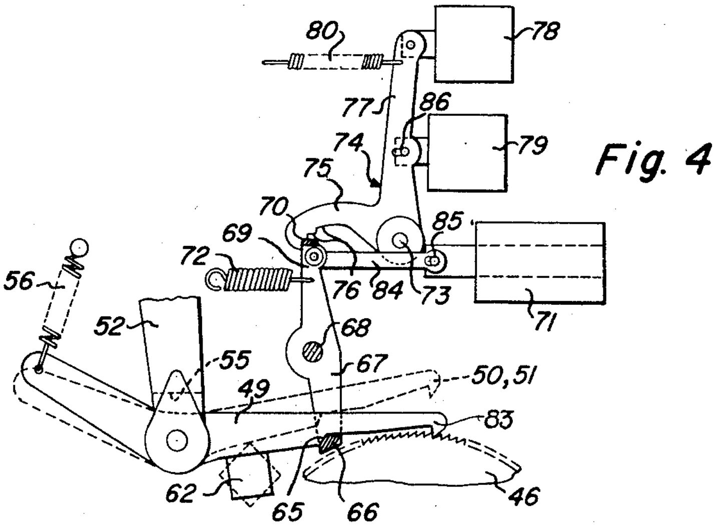
Fig. 4 is a side elevation of a portion of the film advancing mechanism and showing particularly the elements responsive to the signals derived from the card whereby the amount of film to be advanced is varied in accordance with said signals.

As in the pending application, cam means designated by numeral 62 in Figs. 1 and 4 is arranged beneath pawls 49, 50 and 51 and is provided with slots arranged in quadrature about the periphery thereof and with respect to each pawl. The slots permit its respective pawl to be moved by springs 56 into engaging relation with its respective ratchet while the other pawls are prevented from attaining such position but are permitted to move thereover as arm 52 is oscillated.

Figure 6:
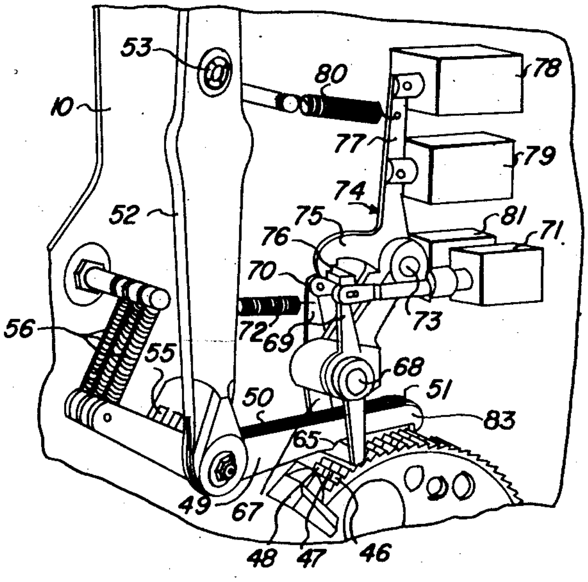
Fig. 6 is a perspective view of the mechanism shown in Fig. 4.

With reference particularly to Figs. 1, 4 and 6, pawls 49—51 are provided on the underside thereof with a notch 65. This notch is adapted to be engaged by connecting portion 66 of a member 67 pivotally mounted on frame 10 at 68 intermediate portion 66 and its other end 69. A latching bar 70 connects ends 69 which have a solenoid 71 connected thereto by link 84 on one end and a solenoid 81 connected to the other end by means of a pin 85 and a slot in the connecting link 84 connected thereto, said member 67 being biased by spring 72 in a direction opposed to the action of solenoid 71. Pivotally mounted on frame 10 at 73 is a bell crank lever 74 which has an arm 75 provided with a plurality of notches 76 and an arm 77. At the end of arm 77 a solenoid 78 is pivotally connected and intermediate this connection and the pivot point of lever 74, a second solenoid 79 is connected by means of a pin and slot 86 in lever 74, both solenoids 78 and 79 being capable of rotating lever 74 in the same direction but by different amounts and being opposed by spring 80 connected to arm 77.

Cam means 62 permits only the selected one of said pawls to be operative at any one time, the inoperative pawls then assuming a position as shown in dotted lines in Fig. 4 but being capable of movement over their respective ratchets. The position of member 67 is determined by the notch 76 engaging latching bar 70 which, in turn, determines the position of portion 66 with respect to notch 65. By this means, i. e., notch 65 and portion 66, nose 83 of the operative pawl is raised and lowered with respect to the ratchet teeth. In the embodiment of the apparatus disclosed, arm 52 oscillates and positions the nose 83 in its maximum movement to the right, as viewed in Fig. 4, which places it in a position to advance the ratchet by an amount equivalent to three teeth or three increments. During movement of the operative pawl to the right, it is merely moved over the teeth of the ratchet to its maximum right-hand position. As arm 52 moves the pawl to the left, notch 65 and portion 66 cooperate to lower the operative pawl at the proper time to engage the proper tooth on the ratchet as determined by the position of member 67 with respect to notches 76 in arm 75 of bell crank 74. Notch 65 and portion 66 cooperate, therefore, substantially as a cam and follower to lower the pawl at the proper instant to engage the correct ratchet tooth as designated by the signal derived from the card to advance the film strip when the pawl is moved to the left.

The solenoids 71, 78, 79 and 81 are energized independently and in combination with one another and provide an actuating means for positioning one of notches 76 with respect to latching bar 70 for positioning portion 66 with respect to the operative pawl in accordance with the number of increments of film to be advanced. Solenoids 71, 78, 79 and 81 are actuated in accordance with the signals derived from code designations 31 on card C, as will be described hereinafter. Springs 72 and 80 counteract solenoids 71, 78, 79 and 81 to maintain bar 70 and notches 76 in engagement. Also the action of these springs is such as to normally maintain portion 66 in a position with respect to the operative pawl for advancing a single increment of film. It can be readily appreciated from the foregoing description that pivotal member 67 is capable of assuming a plurality of positions with respect to the operative pawl as determined by notches 76 and the group of solenoids actuating pivotal member 74.

Figure 5:
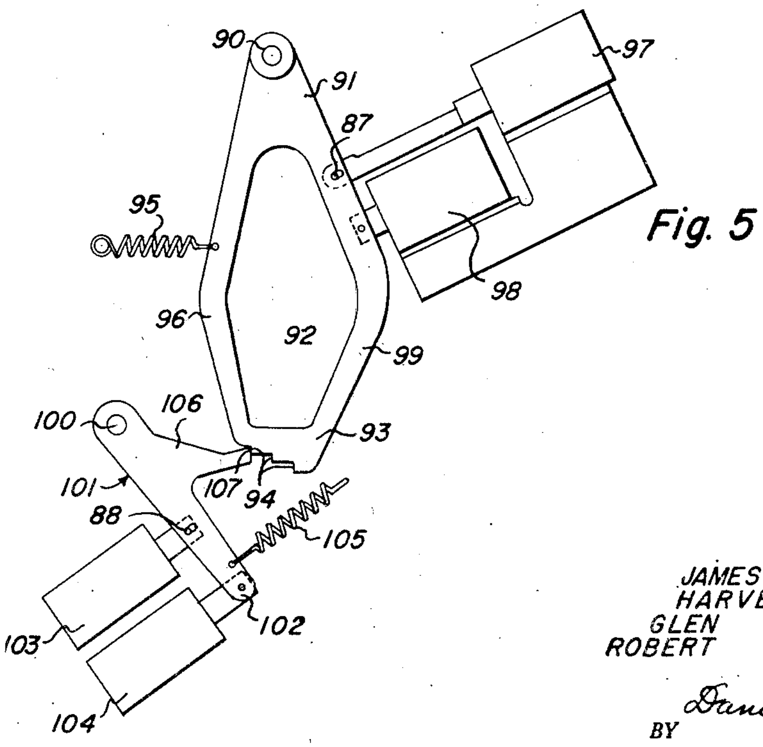
Fig. 5 is a side elevation of the actuating mechanism for the masking means and showing particularly the plurality of members which move the movable mask member to vary the width of the exposure aperture in accordance with said signals.
Figure 8:
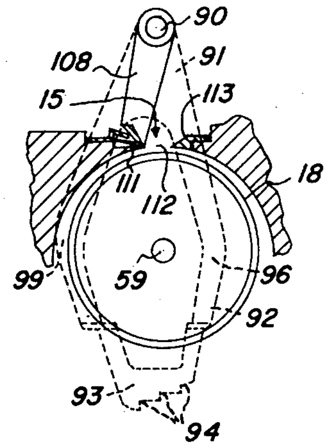
Fig. 8 is a detail sectional view taken substantially on line 8—8 in Fig. 7 and showing the arrangement of the masking means in the exposure station.
Figure 7:
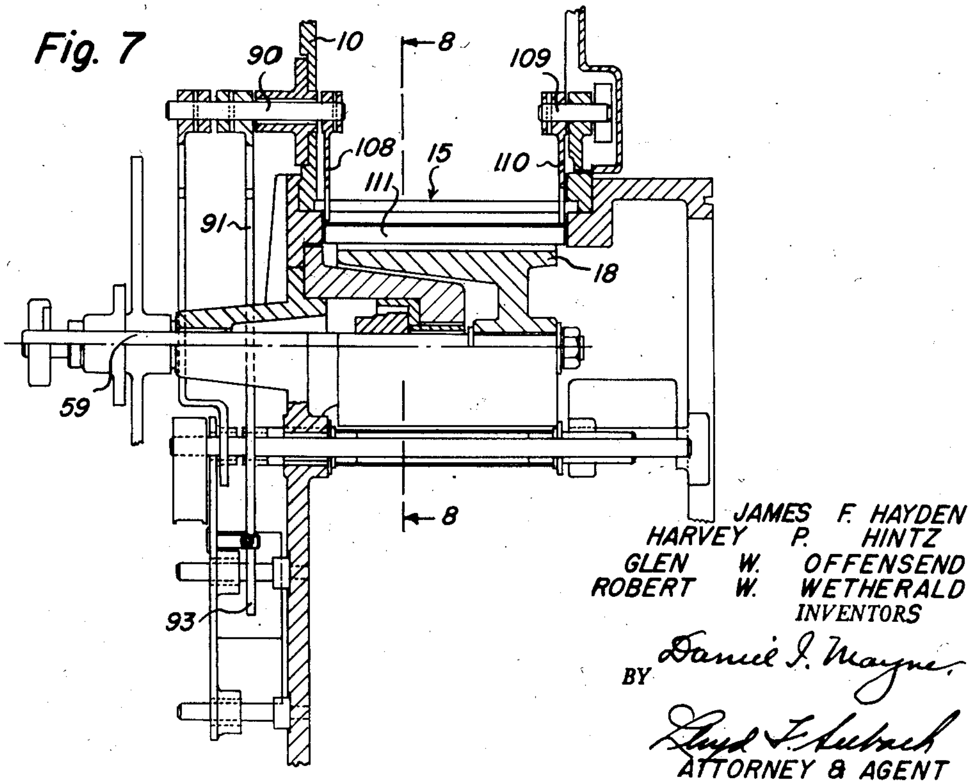
Fig. 7 is a partial sectional view taken substantially on line 7—7 in Fig. 1 and showing the relation of the masking means and film drive roll in the exposure station.

Pivotally mounted externally of frame 10 on shaft 90 in Fig. 5 is a pivotal member 91 provided with an aperture 92 for clearing shaft 59 on which film drive roll 18 is mounted. Member 91 is also provided at the lower end 93 opposite pivotal point 90 with a plurality of steps or notches 94. Spring 95 is secured to one side 96 of member 91 and solenoids 97 and 98 are connected to the other side 99 thereof, solenoid 97 being connected by a pin and slot 87 in lever 91. Pivotally mounted to one side of member 90 and on frame 10 at 100 is a bell crank lever 101 having an arm 102 to which solenoids 103 and 104 and a spring 105 are connected, solenoid 103 being connected by a pin and slot 88 in lever 101, and an arm 106 having a nose 107 for engaging one of the notches 94. With reference to Figs. 7 and 8, shaft 90 extends through frame 10 and has secured thereto an arm 108 on the inner side of frame 10. Aligned with shaft 90 is a stub shaft 109 having fixed thereto an arm 110. Arms 108 and 110 are connected by mask member 111 which extends across exposure aperture 112 in exposure station 15 and constitutes a movable masking member, see Fig. 8. A fixed mask member 113 is arranged adjacent film drive roll 18. With the energization of solenoids 97, 98, 103 and 104 by the signals derived from code designations 31, as will be described hereinafter, members 91 and 101 are positioned with respect to one another as determined by the one of notches 94 and the particular solenoid or combination of solenoids energized.

As shown in Figs. 5 and 8 nose 107 is in engagement with the notch 94 which positions member 91 farthest to the right and represents the maximum opening of aperture 112 which is equivalent to three increments of area to be copied. Corresponding to this maximum position of member 91, arms 108 and 110 and mask member 111 are moved therewith and to the left with respect to fixed mask member 113. Accordingly, from the foregoing description, the pivotal members 67, 74, 91 and 101 together with the solenoids connected to these members constitutes a means for varying the amount of film advanced and the size of the exposure aperture in accordance with signals derived from code designations 31 on card C.

Referring now to the wiring diagram disclosed in Fig. 9, 115 designates a receptacle for a line plug and having one lead 116 connected to ground. Circuit breakers 117 are connected in each of lines 118 and 119. Line switches 120 and 121 are connected in each of lines 118 and 119 and across a contact of each switch an auxiliary receptacle 122 is connected by lines 123 and 124 with a switch 125 connected thereacross. A power supply 126 for lamp 39 is connected across lines 118 and 119 by lines 127 and 128, the manually-operated single pole switch 130 can be used to cut out lamp power supply 126. 133 designates a spark coil in the lamp circuit and switch 134 is cam-actuated to energize relay 135 for actuating a counter. Solenoid 136, relay 137 and solenoid 138 are connected across lines 118 and 119 by lines 139, 140 and 141 and switches 142, 143 and 144, respectively, switch 142 being cam-actuated upon completion of each column to energize solenoid 136 associated with an electro-mechanical counter, switch 143 being actuated by each card as it leaves photographing station 12 to energize relay 137 also associated with a counter, and switch 144 being cam-actuated to energize solenoid 138 for raising the stack of cards in the feeder station to permit selection of the proper pawl and ratchet for the next column. In line 145 are connected relay 146, switches 147, 148 and 149 and a start switch 150 which is connected across switch 149. Switches 147 and 148 are normally closed, switch 147 being actuated to an open position upon jamming of cards in the feeding station and switch 148 being manually actuated to an open position for test purposes. Relay 151 and switch 152 are connected across lines 118 and 119 by line 153 and a start switch 154 is connected across switch 152. By lines 155, 156 and a common line 157, transformers 158 and 159 are connected across lines 118 and 119, transformer 158 supplying a voltage to the power pilot lamp 160, the film alarm buzzer 161, the motor pilot lamp 162 and the photocell exciter lamp 163, and transformer 159 supplying a voltage to rectifier 164 for the brake clutch 165. Relay 166 is connected across lines 141 and 153 by line 167 and controls switch 168 in a voltage cut-off circuit 172 for the actuating solenoids described hereinbefore. Switch 169 is cam-actuated to maintain the circuit operative only during photographing of the cards and is opened in conjunction with the cam stop switch 149. As described in the above-mentioned application, a plurality of cams on the ratchet shaft 57 actuate the switches associated therewith in proper timed relation.

Upon closure of line switches 120 and 121, voltage is supplied to the circuit of lines 118 and 119, but motor 20 cannot function because switches 170 and 171 in line 118 are open. However, voltage is supplied to power supply 126 for lamp 39. Start switches 150 and 154 are then closed to complete circuits through lines 145 and 153 for energizing relays 146 and 151 which close switches 170, 171 and 152. Motor 20 is then energized and the cam associated with switch 149 closes said switch so that by means of switches 149 and 152 solenoids 146 and 151 are maintained in an energized state upon release of switches 150 and 154. Also upon closure of switches 120 and 121, a voltage is supplied to transformers 158 and 159.

With reference to Figs. 2, 3 and 10–13, as card C passes through scanning station 35 arranged ahead of photographing station 12, it passes between photocell 175 and exciter lamp 163 with an associated lens system 176, which are arranged in alignment for sensing the perforated code designations 31 in card C. Although in the described embodiment of the invention the code designations 31 are perforated in card C, such designations can also be printed on the cards and sensed by photoelectric cell which will be responsive to the reflected light rather than the transmitted light. Also such designations can be sensed by brushes or other medium which are capable of deriving a signal therefrom. In the card C shown in Fig. 3, two perforations 31 are representative of the three increments of area to be copied. With this designation no perforations are representative of one increment and one perforation is representative of two increments, etc. This designation arrangement is used in order to minimize the amount of card area necessary for the code and to simplify the circuitry about to be described.

Figure 10:
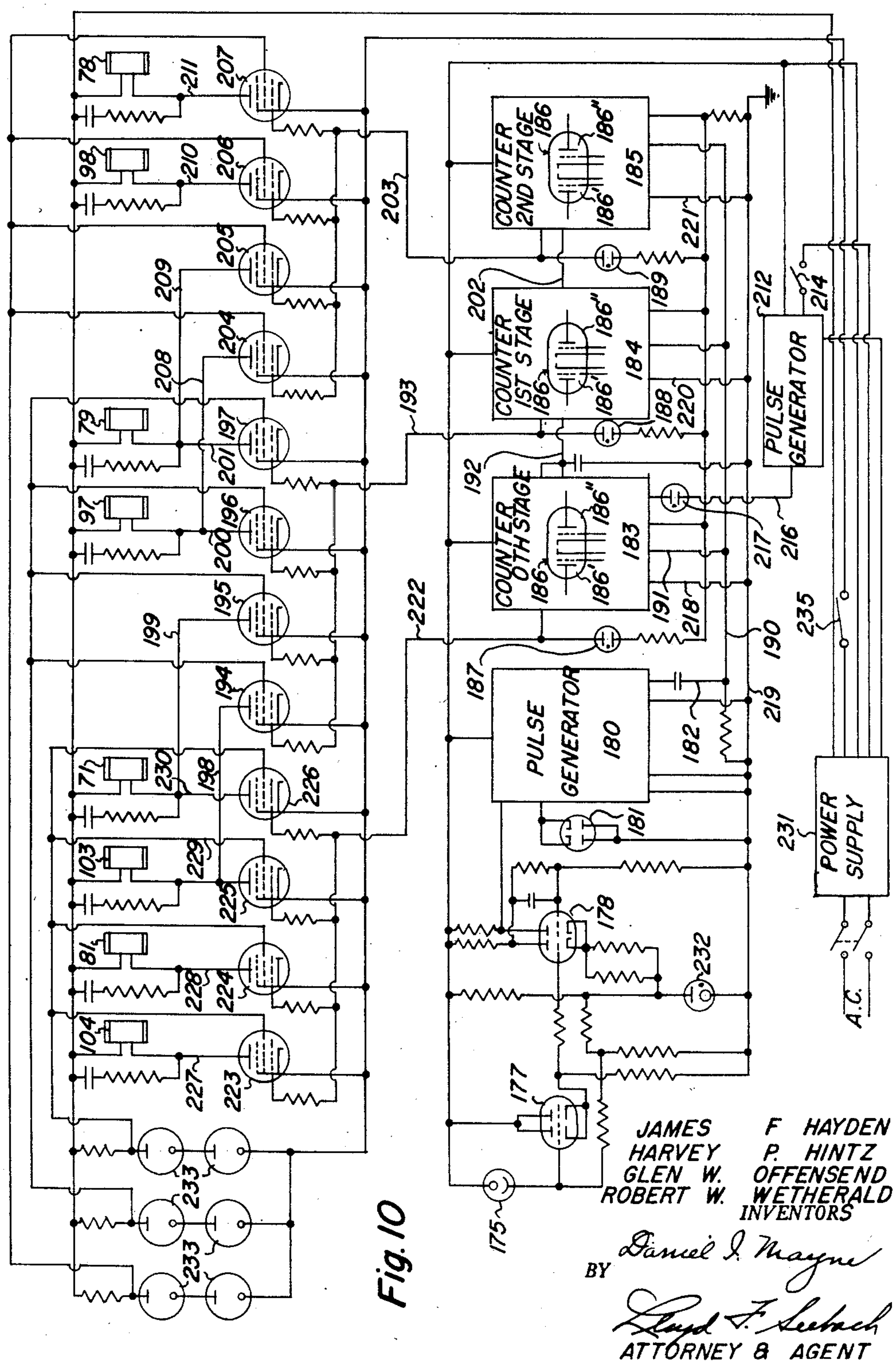
Fig. 10 is a wiring diagram of the circuits responsive to the signals derived from each card for initiating the actuating means associated with the film advance and the masking means.

In Fig. 10, photocell 175 derives either no signal, one signal or two signals from designations 31 on cards C as they pass through scanning station 35. The signal or signals derived by photocell 175 from a card having designations 31 is delivered to the control grids of the amplifier tube 177 connected as a cathode follower. The amplifier signal is then transmitted to the left control grid of triggering tube 178 which, in turn, transmits a signal to the control grid of tube 179 in pulse generator circuit 180. Tube 181 prevents pulses of the wrong polarity from being transmitted to tube 179 in pulse generator 180. Pulse generator 180 is a commercially available circuit utilized as a driving unit for linear counters and produces a negative output pulse in line 182. This negative pulse is transmitted to the counter circuits 183, 184 and 185.

Figures 11, 12, 13:
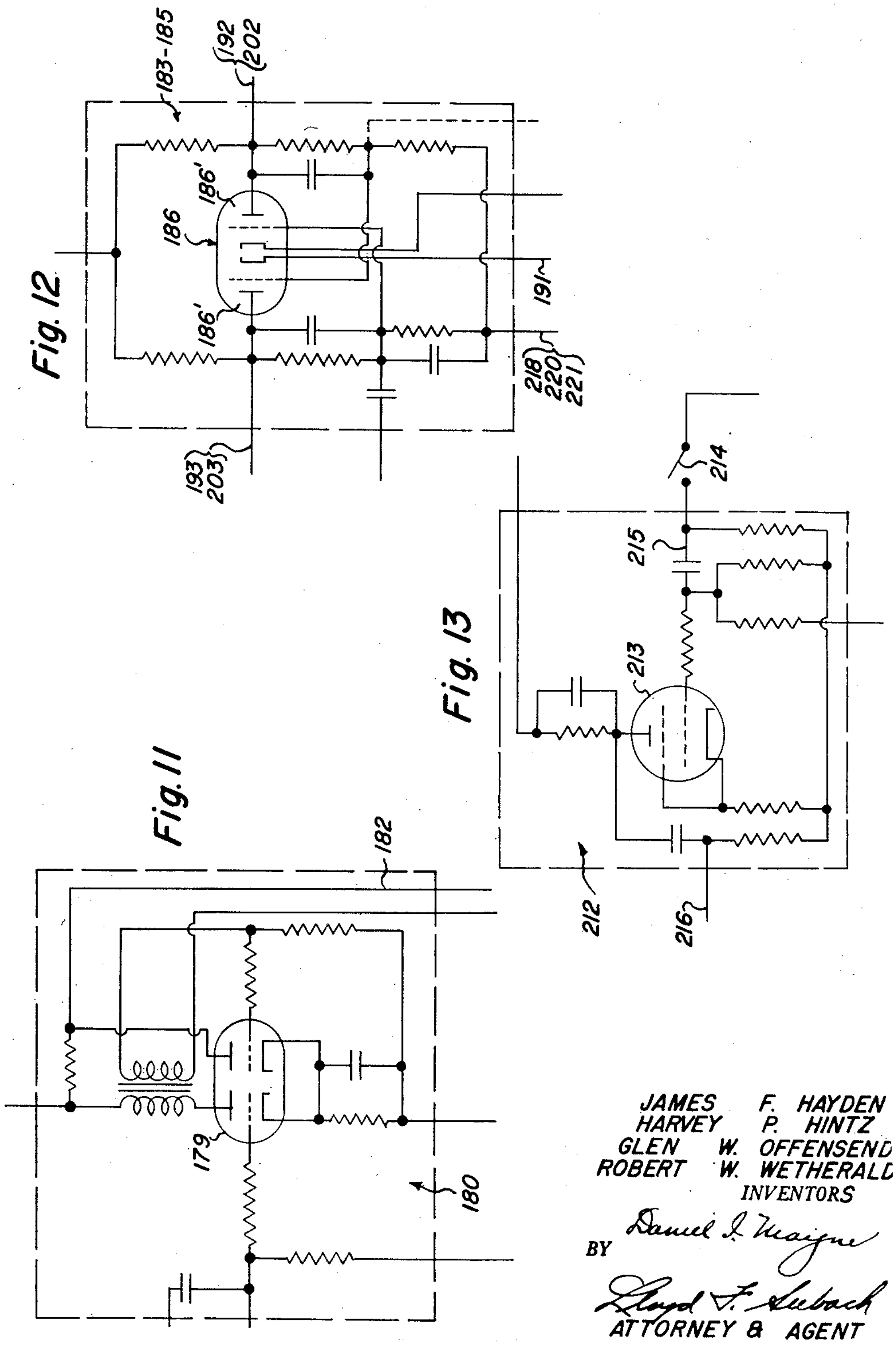
Figs. 11, 12 and 13 are detail wiring diagrams of the units represented by blocks in Fig. 10.

In the counters 183, 184 and 185, see Fig. 12, a duo triode tube 186 is utilized in each stage. However, the normal state of tube 186 in the 0th stage of counter 183 is for triode 186″ to be conducting whereas in the 1st and 2nd stages the triodes 186′ are conducting. These conditions represent the first stable state with a positive potential at the lefthand plate of the initial or 0th stage and such condition is indicated by lighting of the 0th stage lamp 187. No other lamp is lit since the currents drawn through the conducting lefthand triodes 186′ of the tubes in counters 184 and 185 are sufficient to drop the plate potentials below the ignition point of lamps 188 and 189.

The negative pulse in line 182 is applied to the cathode of tube 186′ of the duo triode tube 186 in counter 183 by means of lines 190 and 191 and the trigger action of the 0th stage cuts off the righthand triode 186″ producing a positive signal at its plate. This signal is transferred through line 192 to the 1st stage or counter 184 and to the control grids of tube 186 which turns on the righthand triode 186″ of tube 186 in counter 184 to produce a positive signal at the plate of the lefthand triode 186′ which is cut off. This positive plate signal is delivered by line 193 to the control grids of tubes 194, 195, 196 and 197 to render these tubes conducting when switch 235 is closed by a cam on shaft 57 to supply a voltage to the cathodes of the tube in proper timed relation. Solenoids 103, 71, 97 and 79 are then energized by means of lines 198, 199, 200 and 201 which connect the respective tubes and solenoids. Since a single pulse is indicative of two increments of area to be copied, energization of solenoids 103, 71, 97 and 79 together with springs 105, 72, 95 and 80 result in positioning members 101, 67, 91 and 74, respectively, for providing two increments of film to be advanced and an exposure aperture in accordance therewith.

A second negative pulse derived from the same card and which would be indicative of three increments of area is applied to the cathode of triode 186′ in tube 186 of the 1st stage or counter 184. This pulse renders tube 186′ conducting and cuts off tube 186″ which was conducting as a result of the first negative pulse. The positive pulse at the plate of tube 186″ is then transmitted by line 202 to the control grids of tube 186 in the 2nd stage of counter 185 thereby triggering the tube to render tube 186″ conducting and cutting off tube 186′. The positive signal at the plate of tube 186′ is transmitted by line 203 to the control grids of tubes 204, 205, 206 and 207 which are then rendered conductive to cause energization of solenoids 97, 79, 98 and 78 by means of lines 208, 209, 210 and 211 which result in positioning members 101, 91, 67 and 74 for permitting three increments of film to be advanced and adjusting the exposure aperture in accordance therewith. As noted hereinbefore the number of increments of copy area on the cards can be varied and with any such variation the number of counter circuits must also be varied. Hence, any reasonable number of increments can be accommodated by using a number of counters consistent with the number of increments.

Since the 2nd stage or counter 185 is not connected back to the 0th stage or counter 183, pulse generator 212 is provided as a reset means. The pulse generator 212 is a commercial unit which provides a sharp power pulse and tube 213 is quenched after each input pulse by a time constant incorporated in the plate circuit. The input pulse is derived from a switch 214 which is cam-actuated in synchronism with the cards being moved into the photographing station and is delivered to the control grid of tube 213 by line 215. The output pulse is delivered by line 216 through neon lamp 217 to the control grids of tube 186 in counter 183 and to the control grids of tubes 186 in counters 184 and 185 by line 218, 219, 220 and 221. This reset signal places each of the counters in their original state irrespective of one or two signals being derived from the card. However, in the resetting of counter 183; that is, the change-over rendering tube 186″ conducting instead of 186′ produces a positive pulse on the plate of the tube 186' which is transmitted by line 222 to the control grids of tubes 223, 224, 225 and 226 to render these tubes conductive only when switch 235 is cyclically closed and no pulse has been previously transmitted to counters 184 and 185. Solenoids 104, 81, 103 and 71 are then energized by means of lines 227, 228, 229 and 230, said solenoids positioning members 101, 91, 61 and 74 in a position for a single increment of film to be advanced and adjusting the exposure aperture in accordance therewith. As a result, if any card or successive cards passing through station 35 contain no code designations 31, photocell 175 derives no signal from such cards. However, since counter 183 is always reset to its normal state after each card and switch 235 is actuated after the signals are received from the card, solenoids 104, 81, 103 and 71 will be energized whenever no signal is received from a card or successive cards. There is no need for any signal from one-line cards, therefore, and, hence, no signal is indicative of a single increment.

In Fig. 10, 231 designates a commercial power supply for providing the necessary voltages and 232 and 233 designate voltage regulator tubes in the counter circuits and the relay control tube circuits. The various units are commercially available and in combination provide a means for permitting the film advance and exposure aperture to be varied in accordance with the number of increments of area to be copied as designated by code on each of the cards.

With reference particularly to Figs. 4, 5, 6, 8 and 10 and assuming that the card in photographing station 12 requires three increments of area to be copied, then the position of the various levers and elements is as shown in Figs. 4 and 5. As this card is moved toward the receptacle by rolls 13 after being photographed and before the code designations 31 on the next card have reached a position for being scanned by photocell 175, switch 214 causes pulse generator 212 to deliver a sharp pulse to the 0th stage or counter 183 to reset counters 183, 184 and 185. As described above, this reset pulse places tube 186 in counter 183 in condition to energize solenoids 104, 81, 103, and 71 by means of tubes 223, 224, 225 and 226 provided the following card contains no designations 31. If it is assumed the following card contains only a single line or area to be copied, then when switch 235 is cyclically closed, tube 186 causes solenoids 104, 81, 103 and 71 to be energized. Solenoid 104 which is pivotally fixed to lever 101 moves lever 101 to the left about its pivot 100 against the action of spring 105 and disengages nose 107 from notch 94. Solenoids 103, although energized, is not capable of providing sufficient movement but permits the further movement of lever 100 because of slot 88. The movement imparted to lever 101 by solenoid 104, however, is sufficient to place it in the path of the lowermost notch 94 which is moved against said nose by the action of spring 95 which also moves pivotal member 91 to the left. Movement of member 91 causes a partial rotation of its shaft 90 and thereby movement of arms 108 and 110 to position movable mask member 111 with respect to fixed mask member 113 to provide an exposure aperture corresponding to one increment of area to be copied. The action of springs 105 and 95 is such as to maintain nose 107 and the engaged notch in intimate contact.

Likewise, solenoids 71 and 81, when energized, move pivotal member 67 in a clockwise direction about its pivot point 68. Solenoid 81 moves member by an amount sufficient to place latching bar 70 in a position for engaging the innermost notch 76, whereas solenoid 71 permits movement because of slot 85, this movement also being against the action of the spring 72. Connecting portion 66 is then moved with respect to notch 65 on the operative pawl which at this time has been moved to the left by arm 52. Spring 80 causes lever 74 to be rotated about its pivot 73 until the upper notch is engaged by bar 70. Both springs 72 and 80 then cooperate to hold bar 70 and notch 76 in intimate contact. The relation of portion 66 to notch 65 is such that as arm 52 moves pawls 49, 50 and 51 to the right, the operative pawl is positioned over the ratchet tooth which will result in three increments of film being moved. However, portion 66 prevents engagement of this tooth and as arm 52 again moves the pawls to the left, the operative pawl is not permitted to engage a tooth until it is over the tooth which will advance one increment at which time notch 65 fully engages portion 66 lowering the operative pawl into engaging relation. As long as successive cards with no code designates 31, which are indicative of a single increment of area to be copied, are moved through scanning station 35, the film advance and exposure aperture are maintained in condition for advancing a single increment of film and providing an exposure aperture in accordance therewith. In other words, the counter 183 is reset for each card, but energization of solenoids 71, 81, 103 and 104 causes no change in the position of the film advancing means or the masking means.

If the next card is provided with code designations 31, then the signal or signals derived therefrom actuate counters 183 and 184 or 183, 184 and 185 depending on whether the card contains one or two such designations. When one signal is received from a card, designating two increments of area to be copied, solenoids 103, 71, 97 and 79 are energized. Since the pulse or pulses derived from designations 31 by photocell 175 initiate counters 183 and 184 or 183, 184 and 185 before switch 235 is closed, energization of solenoids 103, 104, 71 and 81 cannot occur. One signal from designations 31, therefore, places counter 184 in condition for energizing solenoids 103, 71, 97 and 79 when switch 235 is closed, and two signals place counter 185 in condition for energizing solenoids 78, 79, 97 and 98 upon closure of switch 235. Because the previous card designated a single increment of copy, nose 107 is in engagement with the right hand notch and the pin carried by the armature of solenoid 103 is in engagement with lower end of slot 88. Energization of solenoid 103 causes said pin to move lever 101 so nose 107 will be disengaged to permit lever 101 to be moved to the right by solenoid 97 to position the intermediate notch with respect to nose 107, spring 105 returning lever 101 so nose 107 then engages the intermediate notch. This movement of lever 91 also causes movable mask member 117 to be moved with respect to fixed mask member 113. In the same manner, solenoid 79 causes lever 74 to become disengaged from bar 70. Solenoid 71 places bar 70 in a position for engaging the intermediate notch as spring 80 acts on lever 74. Portion 66 of member 67 is then positioned so its relation to notch 65 causes the operative pawl to drop into engagement with the ratchet tooth to the right of the previous tooth which results in two increments of film to be advanced as the pawl is moved to the left by arm 52.

When two signals are received from the same card by counters 183, 184 and 185, denoting three increments of area to be copied, then solenoids 97, 79, 98 and 78 are energized. Solenoids 97 and 98 move member 91 to the right, it being understood that the elements are arranged in the one increment position, as a result of the previous card. Slot 87, therefore, permits movement of the pin on the armature of solenoid 97. Spring 105 causes member 101 to follow to the right so nose 107 will engage the uppermost notch when properly positioned in relation thereto by solenoid 98. Movable mask member 111 is, therefore, positioned by the movement of member 91 with relation to fixed mask member 113 to provide the maximum aperture opening which is in accordance with the three increments of area to be copied. Spring 72 causes member 67 to follow in the same manner so engagement of the outermost notch 76 on member 74 with bar 70 occurs when member 74 is properly positioned with respect thereto by solenoids 78 and 79. The relation between portion 66 and notch 65 is then such that the operative pawl causes movement of an amount of film equivalent to three increments as it is moved to the left by arm 52.

From the foregoing description, it is evident that the pivotal members 67, 74, 91 and 101 together with the solenoids for actuating said members provides a unique means for adjusting the film advance and exposure aperture in accordance with a code on a card. Means other than solenoids can also be utilized for obtaining the movements necessary to adjust the film advance and masking means, such as a step motor, servo motor, or even a motor driven jack screw actuator. It can also be appreciated that the code can be arranged or placed on the card in different ways to provide the same result. Accordingly, since many other modifications and applications of the invention will be suggested and apparent to those skilled in the art, the scope of the invention is pointed out in the appended claims.

Having now particularly described our invention, what we desire to secure by Letters Patent of the United States and what we claim is:

1. In apparatus for photographically copying documents having areas to be copied of variable width, each document being provided with means for designating the width of such area, the combination comprising a photographing station provided with an aperture arranged in accordance with the location of the copy area on said documents when positioned in said photographing station, an exposure station, means for successively feeding said documents into and out of said photographing station, means operatively connected to said feeding means for intermittently moving a film strip through said exposure station in accordance with the movement of said documents into and out of said photographing station, masking means adjacent said exposure station, means arranged ahead of said photographing station for sensing the means designating the width of the area to be copied from the document being moved into said photographing station, and means operatively connected to said masking means and said film moving means and responsive to said sensing means for varying the width of the exposure station and the amount of said film strip to be advanced in accordance with the width of the area to be copied.

2. In apparatus for photographically copying documents having areas to be copied of variable width and provided with a code designating the width of such area, the combination comprising a photographing station provided with an aperture arranged in accordance with the location of the copy area on said documents when positioned in said photographing station, an exposure station, means for successively feeding said documents into and out of said photographing station, film advancing means operatively connected to said feeding means and including a plurality of members adapted to selectively move a film strip through said exposure station in synchronism with the movement of said documents into and out of said photographing station, each of said members being adapted to intermittently move equivalent lengths of said film strip in a different number of increments, means operatively connected to said members for selecting and rendering operative only one of said members, masking means adjacent said exposure aperture including a fixed member and a movable member, means arranged ahead of said photographing station for sensing the means for designating the width of the area to be copied from the document being moved into said photographing station, and means operatively connected to said plurality of members and to said movable mask member and responsive to said sensing means for varying the number of increments of film to be advanced by said operative member and the width of the exposure station in accordance with the width of the area to be copied.

3. In apparatus for photographically copying on equivalent lengths of a film strip the predetermined areas of a preselected number of documents, said documents having areas to be copied which are equal in length and multiples of a predetermined increment in width and provided with code for designating the number of said predetermined increments, the combination comprising a photographing station provided with an aperture arranged in accordance with the location of said area on said documents when said documents are positioned in said photographing station, an exposure station, means for successively feeding said documents into and out of said photographing station, a film drive roll adapted to move said film strip through said exposure station, film advancing means including a plurality of ratchets secured to a common shaft operatively connected to said film drive roll, an oscillatable member operatively connected at one end thereof to said feeding means, and a plurality of pawls pivotally mounted on the other end of said oscillatable member and adapted to actuate said ratchets to intermittently rotate said film drive roll for moving said film strip in synchronism with the movement of said documents, said ratchets for each revolution thereof advancing equivalent lengths of said film strip in a number of different increments, cam means arranged with respect to said pawls for selecting and rendering operative only the pawl and ratchet for advancing said film strip a total number of increments in accordance with the number of predetermined increments comprising the areas on said preselected number of documents, means engaging said pawls and adapted to be moved into a plurality of engaging positions therewith for determining the position of the operative pawl in relation to its respective ratchet in accordance with the amount of film to be advanced, a plurality of actuating means operatively connected to said positioning means for moving said positioning means into different ones of said plurality of engaging positions, masking means adjacent said exposure station including a fixed member and a movable member and a pivotal member operatively connected to said movable member and provided with a plurality of engaging surfaces in accordance with the number of multiples of said predetermined increments, a second plurality of actuating means operatively connected to said pivotal member for imparting movement thereto in different increments to provide an exposure aperture in accordance with the width of the area to be photographed, means arranged ahead of said photographing station for deriving a signal from the code on the document being moved into said photographing station, said signal being indicative of the number of said predetermined increments comprising the area to be copied, and means responsive to said signal for initiating only said actuating means in each of said plurality of actuating means to position the operative pawl in relation to its respective ratchet for advancing said film strip a number of increments corresponding to the number of predetermined increments designated by said code and to position the pivotal member for varying the width of the exposure station in accordance with the width of the area to be copied as designated by said code.

4. In apparatus for photographically copying on equivalent lengths of a film strip the predetermined areas of a preselected number of documents, said documents having areas to be copied which are equal in length and multiples of a predetermined increment in width and provided with code for designating the number of said predetermined increments, the combination comprising a photographing station provided with an aperture arranged in accordance with the location of said area on said documents when said documents are positioned in said photographing station, an exposure station, means for successively feeding said documents into and out of said photographing station, a film drive roll adapted to move said film strip through said exposure station, film advancing means including a plurality of ratchets secured to a common shaft and operatively connected to said film drive roll, an oscillatable member operatively connected at one end thereof to said feeding means and a plurality of pawls pivotally mounted on the other end of said oscillatable member and adapted to actuate said ratchets to intermittently rotate said film drive roll for moving said film strip in synchronism with the movement of said documents, said ratchets for each revolution thereof advancing equivalent lengths of said film strip in a number of different increments, cam means arranged with respect to said pawls for selecting and rendering operative only the pawl and ratchet for advancing said film strip a total number of increments in accordance with the number of predetermined increments comprising the areas on said preselected number of documents, a positioning member pivotally mounted intermediate its ends and having one end thereof adapted to be moved into a plurality of engaging positions with respect to said pawls for determining the relation of the operative pawl with respect to its respective ratchet, a plurality of solenoids operatively connected to said other end for imparting movement thereto, a pivotal member having a portion thereof provided with a plurality of notches for engaging said other end of said positioning member, each of said notches establishing one of said plurality of engaging positions, a plurality of solenoids operatively connected to said pivotal member, each of said solenoids imparting a different amount of movement to said pivotal member for positioning a different one of said notches in engaging relation to the other end of said positioning member, masking means adjacent said exposure station including a fixed member and a movable member and a second pivotal member operatively connected to said movable member and having a plurality of engaging surfaces in accordance with the number of multiples of said predetermined increment, a plurality of solenoids operatively connected to the second pivotal member, each of said solenoids imparting different increments of movement to said pivotal member for providing an exposure aperture in accordance with the area to be photographed, a member pivotally mounted adjacent said second pivotal member and having an actuating portion and a holding portion for engaging one of the surfaces of said second pivotal member to maintain said second pivotal member in a position in accordance with the movement imparted thereto, a plurality of solenoids operatively connected to said actuating portion for disengaging and positioning said holding portion with respect to one of the surfaces of said movable member, scanning means arranged ahead of said photographing station for deriving signals from the code on the document being moved into said photographing station, said signals being indicative of the number of said predetermined increments comprising the copy area of the document, and means including a counter circuit responsive to said signals for initiating said solenoids in predetermined combinations whereby the operative pawl is located in relation to its respective ratchet to advance an amount of said film strip corresponding to the number of predetermined increments and said movable mask member is simultaneously positioned in relation to said fixed member to vary the width of the exposure station in accordance with the width of the area to be copied as designated by said signals.

5. In apparatus for photographically copying documents having areas to be copied of variable width, and provided with means for designating the width of such area, the combination comprising a photographing station provided with an aperture arranged in accordance with the location of the copy area on said documents when positioned in said photographing station, an exposure station, means for successively feeding said documents into and out of said photographing station, means operatively connected to said feeding means for intermittently moving a film strip through said exposure station in accordance with the movement of said documents into and out of said photographing station, masking means adjacent said exposure station, means arranged ahead of said photographing station for sensing the means designating the width of the area to be copied from the document being moved into said photographing station, and means operatively connected to said masking means and responsive to said sensing means for varying the width of the exposure station in accordance with the width of the area to be copied.

6. In apparatus for photographically copying documents having areas to be copied of variable width and provided with a code designating the width of such area, the combination comprising a photographing station provided with an aperture arranged in accordance with the location of the copy area on said documents when positioned in said photographing station, an exposure station, means for successively feeding said documents into and out of said photographing station, means operatively connected to said feeding means for intermittently moving a film strip through said exposure station in accordance with the movement of said documents into and out of said photographing station, masking means adjacent said exposure station including a fixed member and a movable member, means arranged ahead of said photographing station for sensing the code on the document being moved into the photographing station, and means operatively connected to the movable member of said masking means and responsive to said sensing means for varying the width of the exposure station in accordance with the width of the area to be copied.

7. In apparatus for photographically copying documents having areas to be copied which are multiples of a predetermined width, each document being provided with a code designating the number of such multiples, the combination comprising a photographing station provided with an aperture arranged in accordance with the location of the copy area on said documents when positioned in said photographing station, an exposure station, means for successively feeding said documents into and out of said photographing station, means operatively connected to said feeding means for intermittently moving a film strip through said exposure station in accordance with the movement of said documents into and out of said photographing station, masking means adjacent said exposure station including a fixed member and a pivotal member provided with a plurality of engaging surfaces in accordance with the number of multiples of said predetermined widths, a plurality of means operatively connected to said pivotal member for moving said pivotal member, each of said moving means imparting different increments of movement to said pivotal member for providing an exposure aperture in accordance with the area to be photographed, means arranged adjacent said pivotal member for engaging one of the surfaces of said pivotal member to maintain said pivotal member in a position in accordance with the movement imparted thereto by one of said plurality of moving means, a plurality of means operatively connected to said engaging means for disengaging and positioning said engaging means with respect to one of said surfaces in accordance with the movement imparted to said pivotal member, means arranged ahead of said photographing station for sensing the code on the document being moved into said photographing station and deriving signals therefrom indicative of the area to be photographed, and means responsive to said sensing means for actuating said plurality of moving means and said plurality of positioning means in predetermined combinations corresponding to said derived signals.

8. In apparatus for photographically copying documents having areas to be copied which are multiples of a predetermined width, each document being provided with a code designating the number of such multiples, the combination comprising a photographing station provided with an aperture arranged in accordance with the location of the copy area on said documents when positioned in said photographing station, an exposure station, means for successively feeding said documents into and out of said photographing station, means operatively connected to said feeding means for intermittently moving a film strip through said exposure station in accordance with the movement of said documents into and out of said photographing station, masking means adjacent said exposure station including a fixed member, a movable member and a pivotal member operatively connected to said movable member and provided with a plurality of engaging surfaces in accordance with the number of multiples of said predetermined widths, a plurality of solenoids operatively connected to said pivotal member, each of said solenoids imparting different increments of movement to said pivotal member for providing an exposure aperture in accordance with the area to be photographed as denoted by the code on said document, a positioning member pivotally mounted adjacent said pivotal member and having an actuating portion and a holding portion for engaging one of the surfaces of said pivotal members to maintain said pivotal member in a position in accordance with the movement imparted thereto by one of said solenoids, a plurality of solenoids operatively connected to said actuating portion for disengaging and positioning said portion with respect to one of said surfaces, scanning means arranged ahead of said photographing station including photoelectric means for deriving signals from the code on the document being moved into said photographing station indicative of the area to be photographed, and means responsive to said signals for actuating said solenoids in predetermined combinations corresponding to said derived signals.

9. In apparatus for photographically copying documents having areas to be copied of variable width, each document being provided with means for designating the width of such area, the combination comprising a photographing station provided with an aperture arranged in accordance with the location of the copy area on said documents when positioned in said photographing station, an exposure station, means for successively feeding said documents into and out of said photographing station, means operatively connected to said feeding means for intermittently moving a film strip through said exposure station in accordance with the movement of said documents into and out of said photographing station, means arranged ahead of said photographing station for sensing the width of the area to be copied from the document being moved into said photographing station, and means operatively connected to the film feeding means and responsive to said sensing means for varying the amount of said film strip to be advanced in accordance with the width of the area to be copied.

10. In apparatus for photographically copying documents having areas to be copied of variable width, each document being provided with means for designating the width of such area, the combination comprising a photographing station provided with an aperture arranged in accordance with the location of the copy area on said document when positioned in said photographing station, an exposure station, means for successively feeding said documents into and out of said photographing station, film advancing means operatively connected to said feeding means and including a plurality of members adapted to selectively move a film strip through said exposure station in synchronism with the movement of said documents into and out of said photographing station, each of said members being adapted to intermittently move equivalent lengths of said film strip in a different number of increments, means operatively connected to said members for selecting and rendering operative only one of said members, means arranged ahead of said photographing station for sensing the means designating the width of the area to be copied from the document being moved into said photographing station, and means operatively connected to said plurality of members and responsive to said sensing means for varying the number of increments of film advance in accordance with the width of the area to be copied.

11. In apparatus for photographically copying on equivalent lengths of a film strip the predetermined areas of a preselected number of documents, said documents having areas to be copied which are equal in length and multiples of a predetermined increment in width and provided with means for designating the number of said predetermined increments, the combination comprising a photographing station provided with an aperture arranged in accordance with the location of said area on said documents when said documents are positioned in said photographing station, an exposure station, means for successively feeding said documents into and out of said photographing station, a film drive roll adapted to move said film strip through said exposure station, film advancing means including a plurality of ratchets secured to a common shaft operatively connected to said film drive roll, an oscillatable member operatively connected at one end thereof to said feeding means and a plurality of pawls pivotally mounted on the other end of said oscillatable member and adapted to actuate said ratchets to intermittently rotate said film drive roll for moving said film strip in synchronism with the movement of said documents, said ratchets for each revolution thereof advancing equivalent lengths of said film strip in a number of different increments, cam means arranged with respect to said pawls for selecting and rendering operative only the pawl and ratchet for advancing said film strip a total number of increments in accordance with the number of predetermined increments comprising the areas on said preselected number of documents, means arranged ahead of said photographing station for sensing the number of predetermined increments comprising the copy area thereof from the document being moved into said photographing station, and means operatively connected to said pawls and responsive to said sensing means for positioning the operative pawl in relation to its respective ratchet to advance said film strip a number of increments corresponding to the number of predetermined increments designated on the document.

12. In apparatus for photographically copying on equivalent lengths of a film strip the predetermined areas of a preselected number of documents, said documents having areas to be copied which are equal in length and multiples of a predetermined increment in width and provided with means for designating the number of said predetermined increments, the combination comprising a photographing station provided with an aperture arranged in accordance with the location of said area on said documents when said documents are positioned in said photographing station, an exposure station, means for successively feeding said documents into and out of said photographing station, a film drive roll adapted to move said film strip through said exposure station, film advancing means including a plurality of ratchets secured to a common shaft operatively connected to said film drive roll, an oscillatable member operatively connected at one end thereof to said feeding means, and a plurality of pawls pivotally mounted on the other end of said oscillatable member and adapted to actuate said ratchets to intermittently rotate said film drive roll for moving said film strip in synchronism with the movement of said documents, said ratchets for each revolution thereof advancing equivalent lengths of said film strip in a number of different increments, cam means arranged with respect to said pawls for selecting and rendering operative only the pawl and ratchet for advancing said film strip a total number of increments in accordance with the number of predetermined increments comprising the areas on said preselected number of documents, means engaging said pawls and adapted to be moved into a plurality of engaging positions for varying the position of the operative pawl in relation to its respective ratchet in accordance with the amount of film to be advanced, a plurality of actuating members operatively connected to said positioning means, each of said actuating members moving said positioning means into a different one of said plurality of engaging positions, means arranged ahead of said photographing station for sensing the number of predetermined increments comprising the copy area thereof from the document being moved into said photographing station, and means operatively connected to said actuating members and responsive to said sensing means for moving said positioning means into one of said plurality of engaging positions in which said operative pawl is positioned with respect to its respective ratchet to advance an amount of film strip corresponding to the number of predetermined increments designated by said code.

13. In apparatus for photographically copying on equivalent lengths of a film strip the predetermined areas of a preselected number of documents, said documents having areas to be copied which are equal in length and multiples of a predetermined increment in width and provided with means for designating the number of said predetermined increments, the combination comprising a photographing station provided with an aperture arranged in accordance with the location of said area on said documents when said documents are positioned in said photographing station, an exposure station, means for successively feeding said documents into and out of said photographing station, a film drive roll adapted to move said film strip through said exposure station, film advancing means including a plurality of ratchets secured to a common shaft operatively connected to said film drive roll, an oscillatable member operatively connected at one end thereof to said feeding means, and a plurality of pawls pivotally mounted on the other end of said oscillatable member and adapted to actuate said ratchets to intermittently rotate said film drive roll for moving said film strip in synchronism with the movement of said documents, said ratchets for each revolution thereof advancing equivalent lengths of said film strip in a number of different increments, cam means arranged with respect to said pawls for selecting and rendering operative only the pawl and ratchet for advancing said film strip a total number of increments in accordance with the number of predetermined increments comprising the areas on said preselected number of documents, pivotal means including an actuating means and having a portion thereof adapted to be moved into a plurality of engaging positions with respect to said pawls for varying the relation of the operative pawl with respect to its respective ratchet, a second pivotal means having a portion thereof for engaging and maintaining said first-mentioned pivotal means in any one of said plurality of engaging positions, a plurality of solenoids operatively connected to each of said pivotal means for establishing the plurality of engaging positions of said first-mentioned pivotal means, means arranged ahead of said photographing station for deriving a signal from the code on the document being moved into said photographing station, said signal being indicative of the number of said predetermined increments comprising the copy area thereof, and means responsive to said signal for initiating said actuating means to disengage said first-mentioned pivotal means from said second pivotal means and for energizing only a predetermined number of said solenoids to establish an engaging position for said first-mentioned pivotal means in which the operative pawl is positioned with respect to its respective ratchet to advance said film strip an amount corresponding to the number of predetermined increments designated by said signal.

14. In apparatus for photographically copying on equivalent lengths of a film strip the predetermined areas of a preselected number of documents, said documents having areas to be copied which are equal in length and multiples of a predetermined increment in width and provided with means for designating the number of said predetermined increments, the combination comprising a photographing station provided with an aperture arranged in accordance with the location of said area on said documents when said documents are positioned in said photographing station, an exposure station, means for successively feeding said documents into and out of said photographing station, a film drive roll adapted to move said film strip through said exposure station, film advancing means including a plurality of ratchets secured to a common shaft operatively connected to said film drive roll, and an oscillatable member operatively connected at one end thereof to said feeding means, and a plurality of pawls pivotally mounted on the other end of said oscillatable member and adapted to actuate said ratchets to intermittently rotate said film drive roll for moving said film strip in synchronism with the movement of said documents, said ratchets for each revolution thereof advancing equivalent lengths of said film strip in a number of different increments, cam means arranged with respect to said pawls for selecting and rendering operative only the pawl and ratchet for advancing said film strip a total number of increments in accordance with the number of predetermined increments comprising the areas on said preselected number of documents, a positioning member pivotally mounted intermediate its ends and having one end thereof adapted to be moved into a plurality of engaging positions with respect to said pawls for varying the relation of the operative pawl with respect to its respective ratchet, solenoids operatively connected to the other end of said positioning member for imparting movement thereto, a pivotal member having a portion thereof provided with a plurality of notches for engaging the other end of said positioning member, each of said notches establishing one of said plurality of engaging positions, a plurality of solenoids operatively connected to said pivotal member, each of said solenoids imparting a different amount of movement to said pivotal member for positioning a different one of said notches in engaging relation to the other end of said positioning member, means arranged ahead of said photographing station for deriving signals from the code on the document being moved into said photographing station, said signals being indicative of the number of said predetermined increments comprising the copy area thereof, and means including a counter circuit responsive to said signals for initiating a predetermined combination of said solenoids to establish an engaging position for said positioning member in which the operative pawl is located with respect to its respective ratchet to advance an amount of said film strip corresponding to the number of predetermined increments designated by said signals.

References Cited in the file of this patent

UNITED STATES PATENTS

| | | |
|---|---|---|
| 1,966,348 | Hughey | July 10, 1934 |
| 2,084,450 | Paris | June 22, 1937 |